United States Patent [19]

Nozaki et al.

[11] Patent Number: 5,366,824
[45] Date of Patent: Nov. 22, 1994

[54] FLOW BATTERY

[75] Inventors: Ken Nozaki, Tsukuba; Kosuke Kurokawa, Kodaira; Izumi Tsuda, Tsukuba; Osamu Hamamoto, Tokyo; Keiiti Watanabe, Chiba, all of Japan

[73] Assignee: Agency of Industrial Science & Technology, Ministry of International Trade & Industry, Tokyo, Japan

[21] Appl. No.: 138,085

[22] Filed: Oct. 20, 1993

[30] Foreign Application Priority Data

Oct. 21, 1992 [JP] Japan .................................. 4-283244

[51] Int. Cl.$^5$ .................................................. H01M 8/04
[52] U.S. Cl. .................................. 429/34; 429/72; 429/101
[58] Field of Search ............... 429/72, 70, 101, 34, 429/38, 39, 149, 152

[56] References Cited

U.S. PATENT DOCUMENTS

| | | | |
|---|---|---|---|
| 3,540,934 | 11/1970 | Boeke | 429/101 X |
| 4,025,697 | 5/1977 | Hart | 429/70 |
| 4,948,681 | 8/1990 | Zagrodnik | 429/34 |

Primary Examiner—Anthony Skapars
Attorney, Agent, or Firm—Oblon, Spivak, McClelland, Maier & Neustadt

[57] ABSTRACT

A flow battery comprises a plurality of unit cells each constituted of stacked unit cells each consisting of a prescribed number of stacked diaphragms and positive electrode chambers and negative electrode chambers separated by the diaphragms, a positive electrode fluid tank associated with each unit cell to have its outlet connected with an inlet of the positive electrode chamber of the unit cell and its inlet connected with an outlet of the positive chamber of a immediately preceding unit cell, a negative electrode fluid tank associated with each unit cell to have it outlet connected with an inlet of the negative chamber of the unit cell and its inlet connected with outlet of the negative chamber of an immediately preceding unit cell, a pump for supplying positive electrode fluid from the positive electrode fluid tanks to the positive electrode chambers, a pump for supplying negative electrode fluid from the negative electrode fluid tanks to the negative electrode chambers, and means for electrically connecting the plurality of unit cells in series. The flow battery of this configuration achieves improved charge/discharge coulomb efficiency and voltage efficiency, without reducing pump efficiency, and, by increasing the length, and thus the resistance, of the leakage current path reduces the amount of leakage current.

5 Claims, 3 Drawing Sheets

FLOW BATTERY

BACKGROUND OF THE INVENTION

1. Field of the Invention

This invention relates to a flow battery.

2. Description of the Prior Art

Flow batteries include such types as the fuel cell and the zinc halogen cell. There is also a flow-type storage battery, the redox flow battery, that uses fluid battery active material for both the positive and negative electrodes (positive electrode fluid and negative electrode fluid; collectively referred to as "electrode fluid").

Attempts have been made to improve the charge/discharge efficiency of flow batteries by reducing leakage current. Since leakage current consists mainly of current escaping via the electrolyte path, it can be suppressed by increasing the resistance of the leakage current path. One method that has been used for achieving this is to provide a plurality of lines (a manifold) for the flow of electrolyte in and out of the cells of the cell stack so as, in effect, to lengthen (and increase the resistance of) the leakage current path among the cells. Leakage current has also been reduced by completely subdividing all of the electrode fluid lines and providing each subdivision with a tank and a pump, thereby ensuring zero leakage current between subdivisions. From the viewpoint of structural simplicity and the increased safety from leakage current accidents that this structural simplicity provides, the latter method of completely subdividing the electrode fluid lines is preferable.

However, since the complete subdivision of the electrode fluid lines necessitates the provision of as many small pumps as there are subdivisions, this method is disadvantageous in that it greatly increases the amount of labor required for inspection, maintenance and repair, degrades reliability, and reduces overall pump efficiency by 10% or more. The lowering of the pump efficiency is a particular problem in the case of the flow storage battery, whose charge/discharge energy efficiency is affected on the order of from several percent to several tens of percent by the pump efficiency. A decrease in pump efficiency of 10% or more reduces the overall energy efficiency of the battery by several percent. A drop in energy efficiency of several percent is a major problem in secondary batteries, which are intended for the storage of large amounts electric energy.

The object of this invention is to provide a flow battery that overcomes the aforesaid problems of the prior art, more particularly to a flow battery that achieves improved charge/discharge coulomb efficiency and voltage efficiency, without reducing pump efficiency.

SUMMARY OF THE INVENTION

For achieving the aforesaid object, this invention provides a flow battery comprising a plurality of unit cells each constituted of stacked unit cells each consisting of a prescribed number of stacked diaphragms and positive electrode chambers and negative electrode chambers separated by the diaphragms, a positive electrode fluid tank associated with each unit cell to have its outlet connected with an inlet of the positive electrode chamber of the unit cell and its inlet connected with an outlet the positive chamber of an immediately preceding unit cell, a negative electrode fluid tank associated with each unit cell to have its outlet connected with an inlet of the negative chamber of the unit cell and its inlet connected with outlet of the negative chamber of an immediately preceding unit cell, positive electrode fluid supply means for supplying positive electrode fluid from the positive electrode fluid tanks to the positive electrode chambers, negative electrode fluid supply means for supplying negative electrode fluid from the negative electrode fluid tanks to the negative electrode chambers, and means for electrically connecting the plurality of unit cells in series.

The flow battery constituted in the forgoing manner according to this invention is divided into a plurality of unit cells, prescribed numbers of the unit cells are stacked to constitute a plurality of stacks, each unit cell is provided with positive and negative electrode fluid tanks and means are provided for circulating the electrode fluids through the unit cells via the tanks. Owing to this configuration, the leakage current path becomes long and high in resistance, thus reducing the amount of leakage current, and the reaction rate of the electrode fluid flowing into the unit cells is maintained constant, thus prevent degradation of the voltage efficiency. In addition, since the positive electrode fluid and the negative electrode fluid are supplied to the positive electrode chambers and the negative electrode chambers separately, the flow resistance of the electrode fluid is reduced, making it possible to operate the flow battery with only two pumps, one for the positive electrode fluid and one for the negative electrode fluid, and thus to improve the pump efficiency.

The above and other features of the present invention will become apparent from the following description made with reference to the drawings.

DESCRIPTION OF THE PREFERRED EMBODIMENTS

Figure 1:
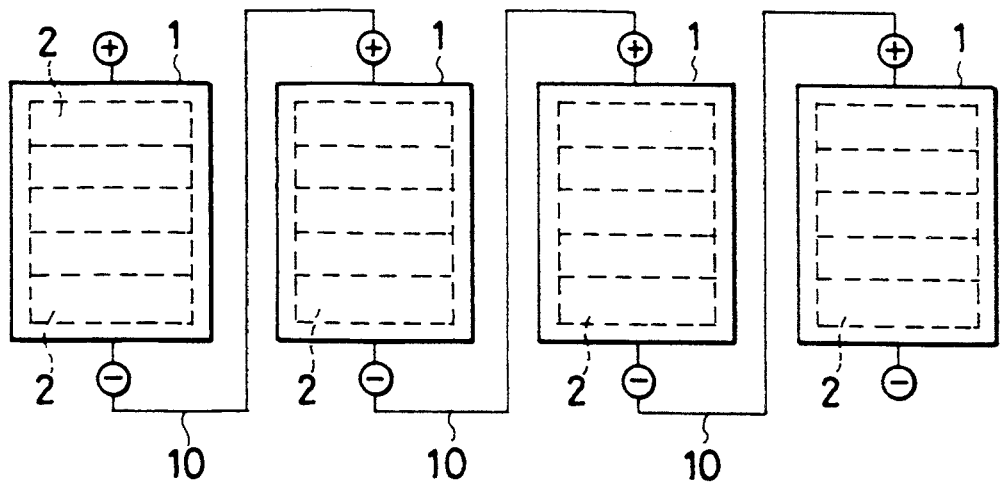
FIG. 1 is a schematic view of an embodiment of the flow battery according to the invention.

The embodiment of the flow battery according to this invention shown in the schematic view of FIG. 1 is configured of a plurality of stacks 1 each consisting of a prescribed number of stacked unit cells 2 and connected in series by leads 10.

Figure 2:
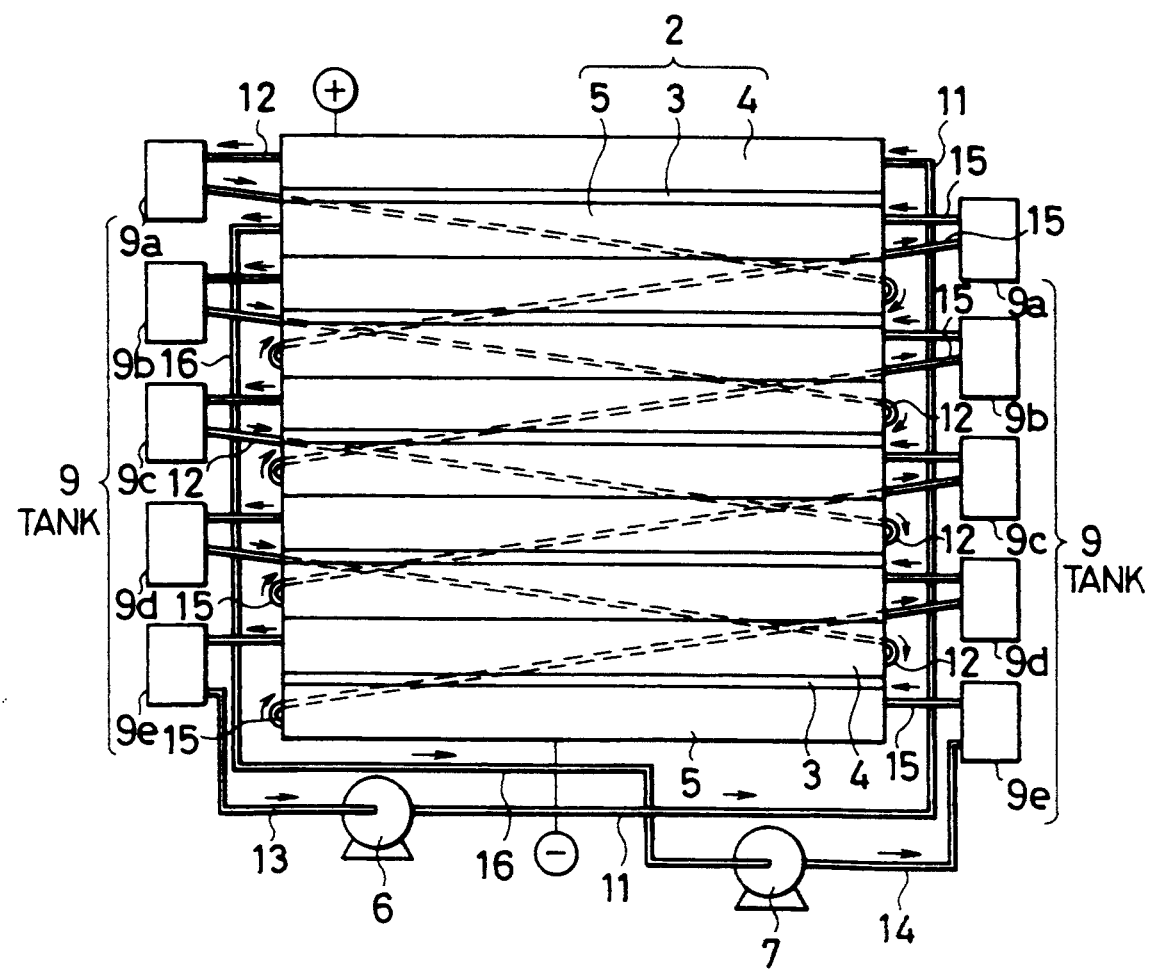
FIG. 2 is a schematic view for explaining the structure of the unit cells constituting the battery of FIG. 1.

As shown in FIG. 2, each stack 1 is constituted of a prescribed number (five in the illustrated example) of stacked, electrically series-connected unit cells 2 each consisting of a positive electrode chamber 4 and a negative electrode chamber 5 separated by an intervening diaphragm 3. The stack 1 is equipped with a positive electrode fluid pump 6, a negative electrode fluid pump 7, a number of positive electrode fluid tanks 8 equal to the number of unit cells 2, and a number of negative electrode fluid tanks 9 equal to the number of unit cells 2. The positive electrode fluid tanks 8 and negative electrode fluid tanks 9 are for holding electrode fluid (active material of the battery in the form of a solution).

The delivery side of the positive electrode fluid pump 6 is connected with the inlet of the first stage (uppermost) positive electrode chamber 4 via a line 11. The outlet of the first stage positive electrode chamber 4 is connected with the inlet of the first stage (uppermost)

positive electrode fluid tank 8a via a line 12 and the outlet of the first stage positive electrode fluid tank 8a is connected with the inlet of the second stage positive electrode chamber via a second segment of the line 12. In a similar manner, the inlet of each subsequent positive electrode chamber (in the order of increasing stage number) is connected with the outlet of the tank of the preceding stage, while the outlet thereof is connected with the inlet of the tank of the same stage. The outlet of the final positive electrode fluid tank is connected with the intake of the positive electrode fluid pump 6 via a line 13.

The delivery side of the negative electrode fluid pump 7 is connected with the inlet of the fifth stage (bottommost) negative electrode fluid tank 9e via a line 14. The outlet of the negative electrode fluid tank 9e is connected with the inlet of the fifth stage (bottommost) negative electrode chamber 5 via a line 15. The outlet of the fifth stage negative electrode chamber 5 is connected with the inlet of the fourth stage negative electrode fluid tank 9d via a second segment of the line 15. In a similar manner, the supply inlet of each subsequent negative electrode chamber (in the order of decreasing stage number) is connected with the outlet of the tank of the same stage, while the outlet thereof is connected with the inlet of the tank of the preceding stage, except for the outlet of the first stage negative electrode chamber, which is connected with the intake side of the negative electrode fluid pump 7 via a line 16.

So as to enable prolonged continuous operation of the flow battery, it is preferable in this invention for the positive electrode fluid tanks 8 and the negative electrode fluid tanks 9 provided in association with the individual unit cells 2 to have a capacity equal to at least five times the amount of electrode fluid contained in the unit cells with which they are associated. By defining the electrode fluid capacity in this manner, it is possible to reduce the potential shift of the electrode fluid appearing as the apparent cell internal resistance flowing into the unit cell to not more than several mV.

From the practical viewpoint, the number of stacked unit cells 2 constituting each stack 1 is preferably in the range of 5 to 20. When the number of unit cells 2 per stack is four or less, the number of stacks 1 constituting the flow battery becomes large. This is undesirable because it results in a complex flow battery structure and also because it increases the number of stack end plates, which are one of the major causes of resistance loss.

When the positive electrode fluid pump 6 and the negative electrode fluid pump 7 are operated, the stack 1 of the foregoing configuration is charged by the passage of positive electrode fluid from the positive electrode fluid tanks 8 into the positive electrode chambers 4 and of negative electrode fluid from the negative electrode fluid tanks 9 into the negative electrode chambers 5.

The positive and negative electrode fluids making contact through the diaphragms 3 between the positive electrode chambers 4 and the negative electrode chambers 5 are progressively fed through the associated tanks to circulate through the positive chambers and negative chambers, respectively.

As explained in the foregoing, each unit cell 2 is equipped with a tank 8 associated with its positive electrode chamber 4 and a tank 9 associated with its negative electrode chamber 5 and the positive and negative electrode fluids are supplied separately, whereby the fluid resistance of the electrolyte is reduced to a level enabling the individual unit cells to be sufficiently operated using a single positive electrode fluid pump and a single negative electrode fluid pump. Since the configuration enables the lines for each of the electrolytes to be connected in series, loss owing to leakage current can be reduced.

The division of the electrolyte supply lines in the foregoing manner makes it possible to reduce the leakage current. On the other hand, however, the amount of electrolyte supplied is inversely proportional to the number of unit cells connected in series, i.e. decreases with increasing number of unit cells, while the pressure of the electrolyte increases in proportion as the number of unit cells increases. This makes it necessary to use compact high-pressure pumps. Generally speaking, however, pumps of this type are more susceptible to damage. In this invention it is therefore necessary for the unit cells to be able to maintain their performance at the lowest flow volume and lowest pressure possible.

Figure 4:
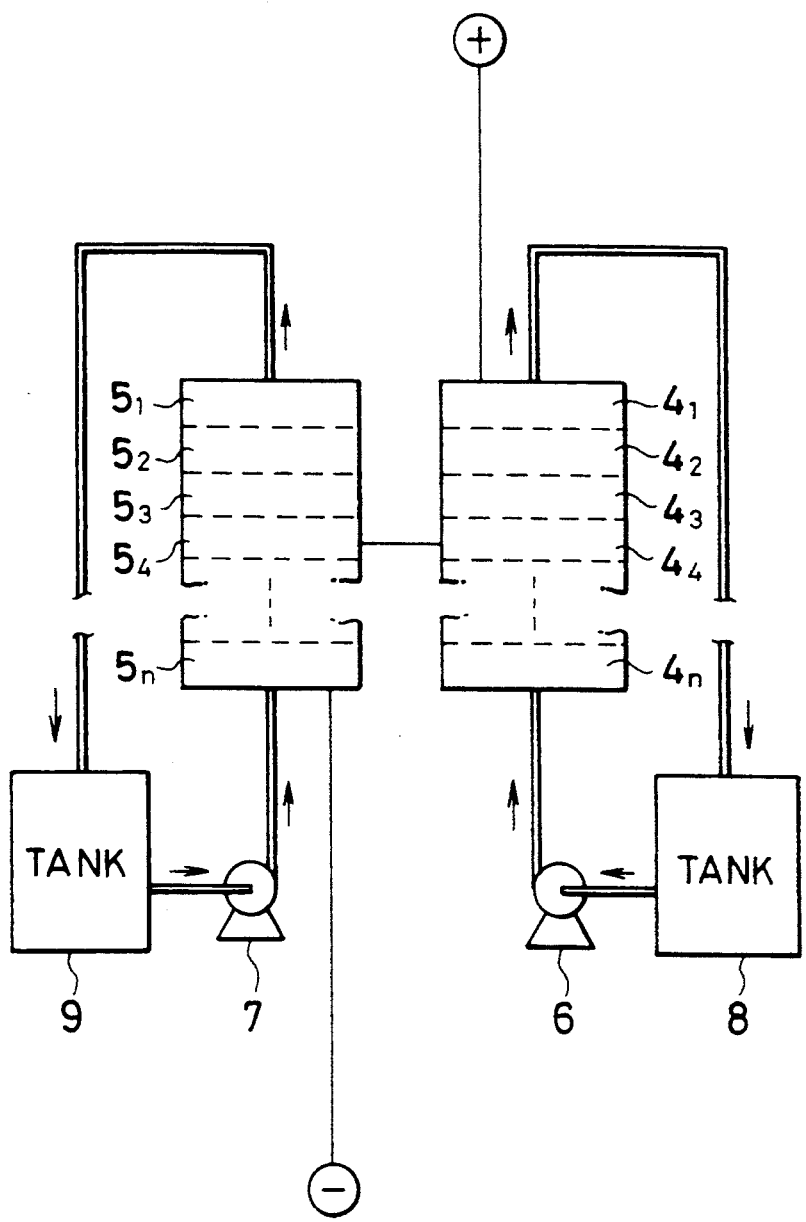
FIG. 4 is a schematic view of a prior art flow battery.

FIG. 4 is a schematic view of an ordinary prior art flow battery. As shown, the positive electrode chamber is divided into n series-connected positive electrode chambers $4_1$, $4_2$, ..., $4_n$ and the negative electrode chamber is divided into n series-connected negative electrode chambers $5_1$, $5_2$, ..., $5_n$. The positive and negative electrode chambers are provided with pumps 6, 7 which are operated for circulating positive and negative electrode fluids from positive and negative electrode fluid tanks 8, 9, through the positive and negative electrode chambers and back to the tanks. In this case, the liquid pressure drops are the same as the pressure drops of the original cells. In the present invention, therefore, the length of the electrodes in the direction of fluid flow is shortened and the electrode fluid is evenly distributed throughout the cells. More specifically, in the present invention it is preferable for the ratio of the lateral length of the flow cell to the vertical length thereof along which the fluid flows to be 2 to 1 or greater.

The electrolyte flow resistance is directly related to the ratio between width (lateral dimension) and the height (vertical dimension) along the fluid flow direction of the electrode. Specifically, for one and the same electrode area, a lower flow resistance can be obtained by reducing the height and increasing the width. In a low flow pressure electrode, however, it is extremely difficult to achieve even electrolyte distribution in the electrode (cell), even in the case where the permeation pressure drop in the electrode is uniform. This can be easily ascertained from the fact that the flow of the electrode fluid is found to lack smoothness at the opposite ends of a cell when the flow is observed transparently in a cell not provided with a permeable electrode, i.e. in an empty cell.

Table 1 shows how pressure drop and liquid distribution uniformity varied with type of electrode and electrode width/height ratio when observed in a transparent cell with an electrode area of 192 cm². (The shape of the electrode was varied by fixing spacers in the cell cavity.)

TABLE 1

| No | Electrode shape etc. | Distribution | Pressure Drop[1] |
|----|---------------------|--------------|------------------|
| 1  | Empty<br>8 cm (h) × 24 cm (w) | Poor | 1 |
| 2  | Empty | Poor | 0.9 |

TABLE 1-continued

| No | Electrode shape etc. | Distribution | Pressure Drop[1] |
|----|---------------------|--------------|------------------|
|    | 24 cm (h) × 8 cm (w) |              |                  |
| 3  | Porous carbon w/grooves | Poor | 1.7 |
|    | 8 cm (h) × 24 cm (w) |   |   |
| 4  | Porous carbon w/grooves | Poor | 2.6 |
|    | 24 cm (h) × 8 cm (w) |   |   |
| 5  | Carbon felt[2] | Poor | 2.5 |
|    | 4 cm (h) × 24 cm (w) × 0.5 cm (t) |   |   |
| 6  | Carbon felt | Good | 4.1 |
|    | 8 cm (h) × 24 cm (w) × 0.5 cm (t) |   |   |
| 7  | Carbon felt | Good | 4.5 |
|    | 8 cm (h) × 24 cm (w) × 0.4 cm (t) |   |   |
| 8  | Carbon felt | Good | 6.3 |
|    | 8 cm (h) × 24 cm (w) × 0.3 cm (t) |   |   |

[1]The pressure difference between the inlet and outlet of an 8 cm (h) × 24 cm (w) cell was defined as a pressure drop of 1.
[2]Only this cell had an electrode area of 96 cm$^2$.

A comparison of the results for electrodes No. 5 and No. 6 shows that a shorter electrode exhibits better distribution. For achieving even distribution in the cells even when the electrode height is small, it is preferable to adopt a configuration in which the electrode flow resistance is uniform throughout the electrode and in which the ratio between the case where the fluid permeable type electrode is inserted and the case in which it is not (No. 1 in Table 1) is 3:1 or greater. The pressure drops in the electrodes in Table 1 which exhibit good electrode fluid distribution (Nos. 6, 7 and 8) are 4 to 6 times those in the case with the electrode removed. Since the electrodes with grooves (Nos. 3 and 4) have low flow resistance, it is hard for them to attain this ratio. It is thus preferable for the pressure drop to be uniform (exhibit a variation between 20 and 30%) and for the pressure drop of the fluid permeable electrodes to account for not less than 75% of that of the cell stack.

Moreover, in this invention it is preferable for the positive and negative electrode fluids to be in counter-flow since this makes it possible to obtain equal average reaction rates (equilibrium potentials) for the positive and negative electrode fluids passing through the individual unit cells.

An embodiment of the invention will now be explained in detail with reference to FIG. 3. The illustrated redox flow battery is comprised mainly of a small unit cell 2a having a positive electrode 4a and a negative electrode 5a and measuring, for example, 100 mm in width and 10 mm in height, similarly constituted small unit cells 2b, 2c, 2d, 2e electrically connected with the unit cell 2a and with each other in series, positive electrode fluid subtanks 8a-8e associated with the positive electrodes 4a-4e of the small unit cells 2a-2e, negative electrode fluid subtanks 9a-9e associated with the negative electrodes 5a-5e, positive electrode fluid flow lines 12, 13, 11 starting from the positive electrode 4a of the small unit cell 2a, continuing to the positive fluid subtank 8a, to the positive electrode 4b of the small unit cell 2b, ..., to the positive electrode 4e of the small unit cell 2e, to the positive electrode fluid tank 8e, and back to the positive electrode 4a of the small unit cell 2a, negative electrode fluid flow lines 15, 16, 14 running counter to the positive electrode fluid flow lines starting from the negative electrode 5e of the small unit cell 2e, continuing to the negative fluid subtank 9e, to the negative electrode 5d of the small unit cell 2e, ..., to the negative electrode 5a of the small unit cell 2a, to the negative electrode fluid tank 9a, and back to the negative electrode 5e of the small unit cell 2e. Reference numeral 6 designates a peristaltic pump used commonly by the positive and negative electrode fluid lines.

In the battery of the aforesaid configuration, the small unit cells 2a-2e are charged/discharged by passing positive electrode fluid and negative electrode fluid therethrough.

Specific examples of the invention will now be explained.

EXAMPLE 1

Figure 3:
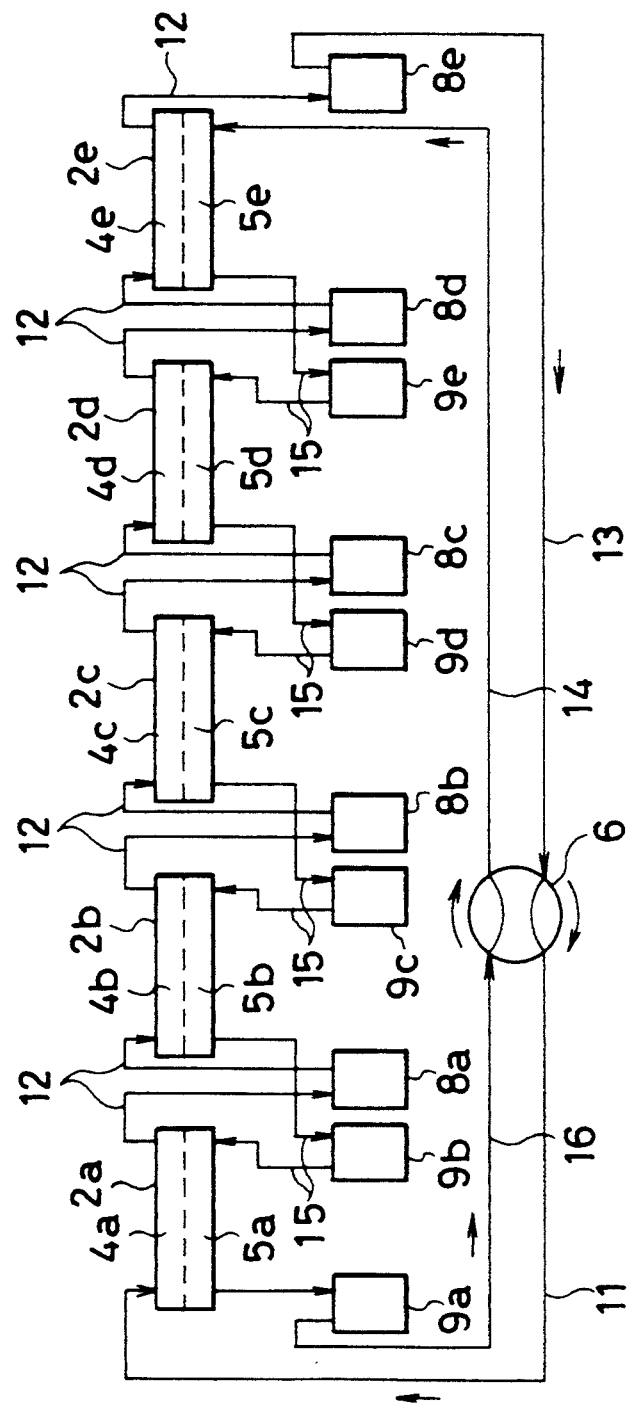
FIG. 3 is a diagram showing an embodiment of the flow battery according to the invention.

A battery fabricated according to the embodiment of FIG. 3 was subjected to a charge/discharge testing using an aqueous solution of 2M vanadate of sulfric acid solution as the positive electrode fluid and an aqueous solution of 2M vanadious sulfate as the negative electrode fluid, an electrode fluid circulation rate of 3 ml/min, a reaction temperature of 17° C. (room temperature), and a constant charge/discharge current of 400 mA (40 mA/cm$^2$). The charge/discharge coulomb efficiency $\eta_Q$ was found to be 98–99% and the voltage efficiency $\eta_V$ to be 89.3%.

COMPARATIVE EXAMPLE 1

A battery was fabricated and tested in the same manner as in Example 1 except that the small unit cells were configured to be 100 mm in height and 10 mm in width. As the flow resistance of the electrode fluid was found to be about 8 times that in Example 1, the fluid feed rate was lowered to 1 ml/min, but the coulomb efficiency remained unchanged at 98–99%. On the other hand, the invert ratio became large in the low-flow, long-flow path electrolytic cells and the resulting shift in the equilibrium potential reduced the voltage efficiency $\eta_V$ to 88.5%.

COMPARATIVE EXAMPLE 2

A battery was fabricated and tested in the same manner as in Example 1 except that the electrode fluid subtanks associated with the positive electrodes 4a-4e and the negative electrodes 5a-5e of the small unit cells were omitted and the pipes were connected directly together. The charge/discharge coulomb efficiency $\eta_Q$ was 96–97% and the voltage efficiency $\eta_V$ was 89.0%.

COMPARATIVE EXAMPLE 3

A battery was fabricated and tested in the same manner as in Example 1 except that only a single small unit cell (2a) was provided. The charge/discharge coulomb efficiency $\eta_Q$ was 98–99% and the voltage efficiency $\eta_V$ was 89.2%.

TABLE 2

|  | Charge/discharge coulomb efficiency ($\eta_Q$) | Voltage efficiency ($\eta_V$) |
|---|---|---|
| Example 1 | 98–99% | 89.3% |
| Comparative Example 1 | 98–99% | 88.5% |
| Comparative Example 2 | 96–97% | 89.0% |
| Comparative Example 3 | 98–99% | 89.2% |

As can be seen in Table 2, the charge/discharge coulomb efficiency $\eta_Q$ and the voltage efficiency $\eta_V$ of Example 1 are nearly the same those in the case of using only a single small unit cell. That is to say, the coulomb efficiency $\eta_Q$ and the voltage efficiency $\eta_V$ of Example 1 were not degraded owing to the use of a plurality of stacked unit cells. On the other hand, the voltage efficiency decreased when an electrode measuring 100 mm in height and 10 mm in width was used (Comparative Example 1) and the charge/discharge coulomb efficiency dropped when the electrolyte subtanks were omitted (Comparative Example 2).

EXAMPLE 2

An example employing a compact system of near practicable scale will now be explained. A carbon felt electrode measuring 8 cm in height and 24 cm in width (and thus having a height to width ratio of 1:3) was inserted into the cavity of each of five flow battery unit cells measuring 32 cm in height and 24 cm in width and having a cavity for accommodating an electrolyte permeable electrode. The electrolyte pressure drop of the cell including the electrolyte manifold and the slits was one-third that with the 32 cm (h)×24 cm (w) carbon felt electrode inserted. A stack was formed by stacking the five 8 cm (h)×24 cm (w) cells. Four so-constituted stacks were connected in series to constitute a battery. Twenty-five liters each of positive and negative electrode fluid was used in the battery. Each cell was equipped with positive and negative electrode fluid subtanks (capacity: 5 liters), similarly to what is shown in FIG. 3.

The electrolyte permeable type battery was charge/discharge tested using centrifugal pumps equipped with dc brushless motors to supply it with an aqueous solution of 2M vanadate of sulfric acid solution as the positive electrode fluid and an aqueous solution of 2M vanadious sulfate as the negative electrode fluid at the rate of 1 liter/minute. The charge/discharge coulomb efficiency and voltage efficiency were 87% and 95% at room temperature and 93% and 94% at 40° C.

COMPARATIVE EXAMPLE 4

A battery was fabricated and charge/discharge tested in the same manner as in Example 2 except that the stacks each consisted of 20 undivided stacked cells each measuring 8 cm in height and 24 cm in width and the intermediate subtanks were replaced with two 30-liter tanks. The charge/discharge coulomb efficiency and voltage efficiency were 85% and 90% at room temperature and 88% and 88% at 40° C.

COMPARATIVE EXAMPLE 5

A battery was fabricated and charge/discharge tested in the same manner as in Example 2 except that the electrolyte subtanks associated with the four stacks were omitted, the stacks were directly connected with lines, and a 30-liter tank was provided ahead of each of the electrode fluid pumps. At room temperature, the charge/discharge coulomb efficiency was 92% and the voltage efficiency was 86%.

COMPARATIVE EXAMPLE 6

A battery was fabricated and charge/discharge tested in the same manner as in Example 2 except that the capacity of the individual electrode fluid subtanks was reduced to 1 liter and 30-liter tanks were additionally installed for the positive and negative electrode fluids. At room temperature, the charge/discharge coulomb efficiency was 93% and the voltage efficiency was 86%.

COMPARATIVE EXAMPLE 7

A battery was fabricated and charge/discharge tested in the same manner as in Example 2 except that the centrifugal pumps were replaced with eight similar pumps associated one each with each of the subtanks, thus establishing a totally independent electrode fluid supply system for each of the four stacks. Although a charge/discharge coulomb efficiency of 95% and a voltage efficiency of 96% were obtained, the pump efficiency inclusive of the motor efficiency (ratio between the energy required for pumping the liquid and the power consumed by the motors) fell sharply, from about 60% (in Example 2) to about 25%.

The results obtained in Example 2 and Comparative Examples 4–7 are summarized in Table 3.

TABLE 3

|  | Chrg/dschrg coulomb efficiency ($\eta_Q$) | Voltage efficiency ($\eta_V$) | Remarks |
| --- | --- | --- | --- |
| Example 2 | 87 (93)% | 95 (94)% | Five 5-liter subtanks Values at 40° C. shown in () |
| Comparative Example 4 | 85 (88)% | 90 (88)% | One 30-liter main tank Values at 40° C. shown in () |
| Comparative Example 5 | 92% | 86% | One 30-liter main tank |
| Comparative Example 6 | 93% | 86% | Five 1-liter subtanks and one 30-liter main tank |
| Comparative Example 7 | 95% | 96% | Eight pumps Pump efficiency 50% |

As can be seen from the results for Example 2 in Table 3, when the shape of the electrode structure was optimized, the pressure drop of the electrode fluid was reduced to a small fraction and a good electrode fluid distribution was established inside the cells, both the discharge/charge coulomb efficiency and the voltage efficiency were high. When all of the cells were connected in series (Comparative Example 4), the charge/discharge coulomb efficiency and the voltage efficiency decreased. When each subtank was equipped with separate electrode fluid subtanks (Comparative Example 5) and when the capacity of the individual subtanks was reduced to 1 liter (Comparative Example 6), the voltage efficiency decreased markedly. When each unit cell was separately provided with its own pumps (Comparative Example 7), the charge/discharge coulomb efficiency and the voltage efficiency both increased but the pump efficiency fell by 50% relative to that in Example 2.

COMPARATIVE EXAMPLE 8

A battery was fabricated and charge/discharge tested in the same manner as in Example 2 except that the carbon felt electrode was replaced with a porous carbon electrode so as to reduce the pressure drop at the electrode portions in the case of using 4 stacks. Although the cell stack pressure drop fell nearly 30%, the even distribution of the electrode fluid in the electrode was markedly disrupted. The arrangement was therefore determined to be impractical. Charge/discharge in the cells experiencing the disruption of fluid distribution exhibited a pronounced drop in voltage efficiency. The charge/discharge energy efficiency loss was at least 10%. A fluid permeable type electrode that results in a pressure drop ratio of less than 3:1 between the cases where it is inserted in and extracted from the cell is not suitable for use in this invention.

EXAMPLE 3 AND COMPARATIVE EXAMPLE 9

The electromotive force at the individual unit cells was measured when the flow battery of Example 2 was operated at room temperature using the same electrode fluids passed in opposite directions (Example 3) and passed in the same direction (Comparative Example 9). The results are shown in Table 4.

TABLE 4

| Stack | Example 3 (Counterflow) | Comparative Example 9 (Parallel flow) |
|---|---|---|
| 1 | 11.2 V | 10.6 V |
| 2 | 11.0 V | 10.9 V |
| 3 | 11.1 V | 11.3 V |
| 4 | 11.4 V | 11.7 V |
| Voltage efficiency $\eta_V$ | 96% | 95% |

Table 4 shows that in the case of Example 3 in which the electrode fluids were passed in counterflow the output voltage at the individual unit cells stabilized and the voltage efficiency was 1 percentage point higher.

Although the invention was explained with reference to a flow storage battery, it can also be applied with excellent results to flow electrolysis cells, for example to an electrolytic synthesis system employing the direct electrolysis method, an electrolytic system regenerating redox mediator in the indirect electrolysis method, or the like.

As is clear from the foregoing description, in accordance with this invention an electrolyte flow battery is divided into a plurality of unit cells, each cell is equipped with electrode fluid tanks and electrode fluid circulating means is provided for circulating electrode fluids through the unit cells via the tanks provided association with the unit cells, whereby marked improvements in charge/discharge coulomb efficiency and voltage efficiency are achieved without reducing pump efficiency. In the case of a redox flow storage battery, for example, the charge/discharge coulomb efficiency ($\eta_Q$) and the voltage efficiency ($\eta_V$) are both improved by 2–7% in comparison with a similar battery not incorporating the improvement according to this invention.

Moreover, by setting the capacity of the tanks to equal 5 or more times the amount of electrode fluid contained in the individual unit cells, it is possible to reduce the potential shift of the electrode fluid appearing as the apparent cell internal resistance.

Also, since length of the permeable electrode in the unit cell in the direction of electrolyte flow is specified as being two or more times its length in the lateral direction, even distribution of the electrode fluid can be achieved within the cells.

Also, since the pressure drop when the fluid permeable electrode is inserted is specified to be three or more times that when the electrode is extracted, even distribution of the electrode fluid can be achieved within the cells.

In addition, since the positive electrode fluid line and the negative electrode fluid line are arranged to pass the positive and negative electrode fluids in counterflow, equal average reaction rates (equilibrium potentials) can be obtained for the positive and negative electrode fluids passing through the individual unit cells, whereby the decomposition voltages and the open-circuit voltages of the unit cells become substantially equal.

What is claimed is:

1. A flow battery comprising a plurality of unit cells each constituted of stacked unit cells each consisting of a prescribed number of stacked diaphragms and positive electrode chambers and negative electrode chambers separated by the diaphragms, a positive electrode fluid tank associated with each unit cell to have its outlet connected with an inlet of the positive electrode chamber of the unit cell and its inlet connected with an outlet of the positive chamber of an immediately preceding unit cell, a negative electrode fluid tank associated with each unit cell to have its outlet connected with an inlet of the negative chamber of the unit cell and its inlet connected with an outlet of the negative chamber of an immediately preceding unit cell, positive electrode fluid supply means for supplying positive electrode fluid from the positive electrode fluid tanks to the positive electrode chambers, negative electrode fluid supply means for supplying negative electrode fluid from the negative electrode fluid tanks to the negative electrode chambers, and means for electrically connecting the plurality of unit cells in series.

2. A flow battery according to claim 1, wherein the capacity of each tank is equal to not less than five times the amount of electrode fluid contained in the individual unit cells.

3. A flow battery according to claim 1, wherein the length of the permeable electrode in each unit cell in the direction of electrode fluid flow is not less than two times its lateral length.

4. A flow battery according to claim 1, wherein the flow resistance of an electrode chamber when an electrode is inserted therein is not less than three times the flow resistance thereof when no electrode is inserted therein.

5. A flow battery according to claim 1, the positive electrode fluid and the negative electrode fluid flow in opposite directions.

* * * * *